April 15, 1930.  A. B. McCOLLOM  1,754,636
FRUIT PITTER
Filed May 9, 1927  3 Sheets-Sheet 1
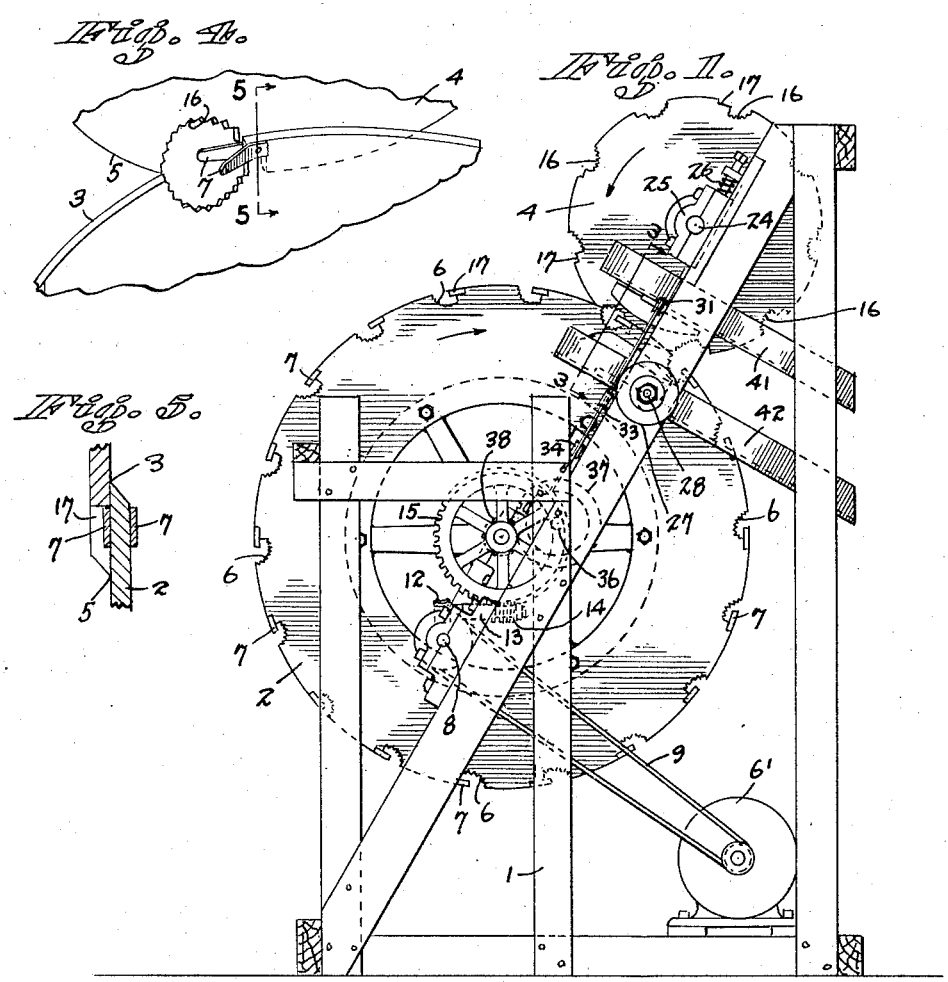
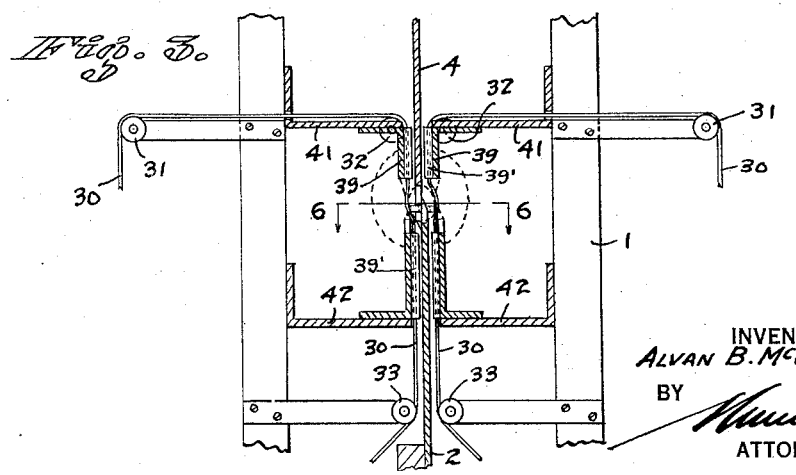
INVENTOR
ALVAN B. McCOLLOM
BY
ATTORNEYS April 15, 1930.  A. B. McCOLLOM  1,754,636
FRUIT PITTER
Filed May 9, 1927  3 Sheets-Sheet 2
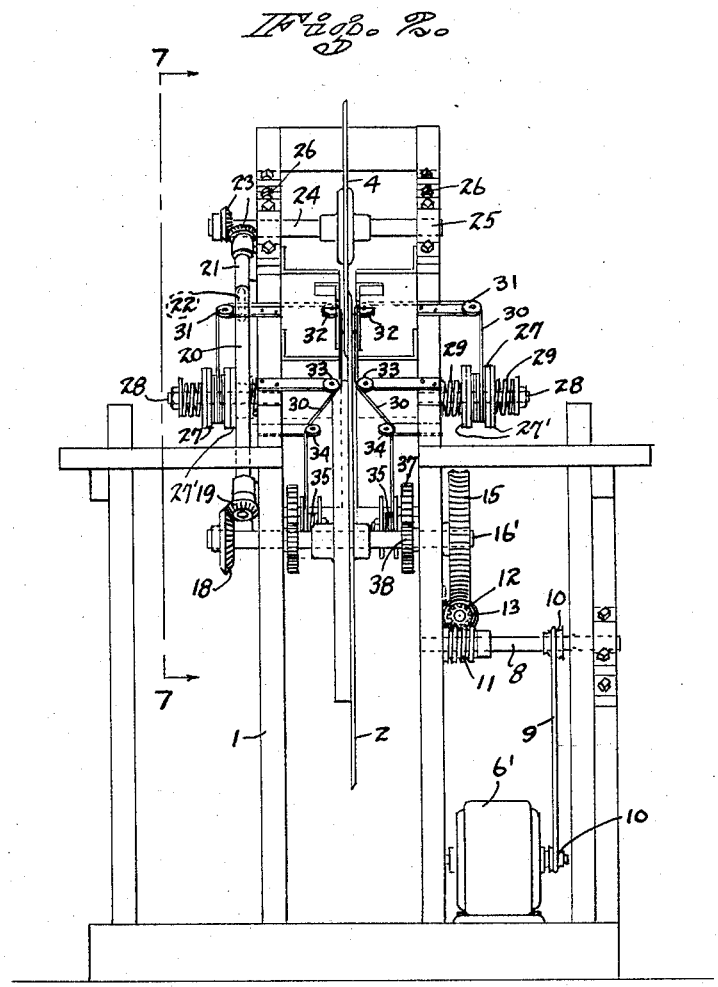
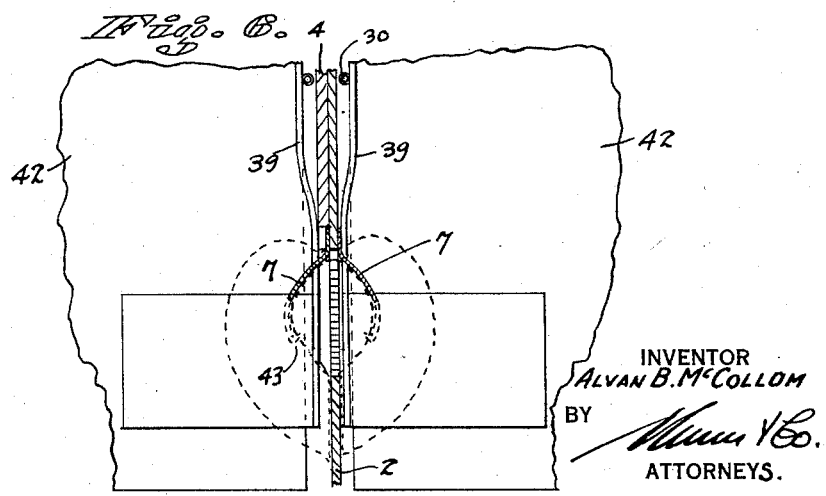
INVENTOR
ALVAN B. McCOLLOM
BY
ATTORNEYS.

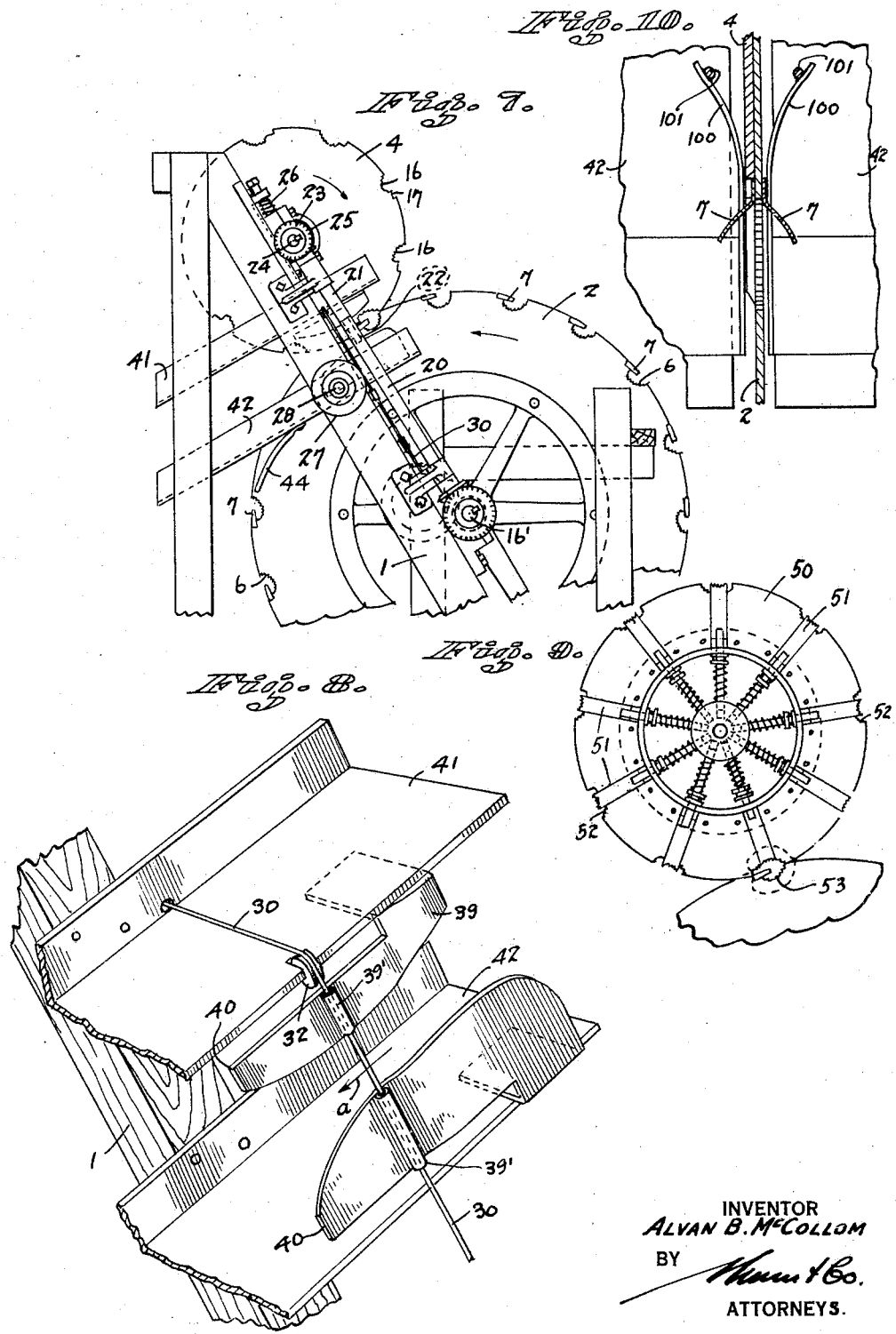

Patented Apr. 15, 1930

1,754,636

UNITED STATES PATENT OFFICE

ALVAN B. McCOLLOM, OF SAN FRANCISCO, CALIFORNIA

FRUIT PITTER

Application filed May 9, 1927. Serial No. 189,978.

My invention relates to improvements in fruit pitters and it consists in the combinations, constructions and arrangement hereinafter described and claimed.

An object of my invention is to provide a fruit pitter which will sever the flesh from the stones of peaches, apricots, and other fruits, the flesh in being severed being cut into two halves and in such a manner as to remove all of the flesh from the stone. The means for cutting all of the flesh from the stone is one of the principal points of my invention.

A further object of my invention is to provide a device of the type described in which means is provided for holding the stone in position while the flesh is being severed therefrom, this holding means automatically releasing the stone subsequent to the removal of the flesh from the stone.

A further object of my invention is to provide a device of the type described which has novel means for accommodating the device to grip stones of various sizes.

Other objects and advantages will appear in the following specification and the novel features of my invention will be particularly described in the appended claims.

My invention is illustrated in the accompanying drawing forming a part of this application, in which Figure 1 is a side elevation of the device;
Figure 2 is a front elevation of the device;
Figure 3 is a section along line 3—3 of Figure 1;
Figure 4 is an enlarged detail view of a portion of the device;
Figure 5 is a section along the line 5—5 of Figure 4;
Figure 6 is a section along the line 6—6 of Figure 3;
Figure 7 is a section along the line 7—7 of Figure 2;
Figure 8 is a perspective view of a portion of the device;
Figure 9 is a view showing a modified form of stone engaging member; and
Figure 10 is a view similar to Figure 6, but showing a modified form of the device.

In carrying out my invention I provide a frame 1 which carries a cutter 2 of a sufficient size to accommodate a number of pieces of fruit about its periphery. The periphery 3 of the disc 2 (see Figure 5) is knife-shaped and bears against a cutter disc 4, the disc 4 partially overlapping the disc 2 and having a knife edge 5 which cooperates with the edge 3 in a manner hereinafter described.

The disc 2 has a plurality of recesses 6 equally spaced about its periphery, the edges of these recesses being provided with saw teeth or other serrated surface for gripping one side of the stone. The recesses 6 are made large enough to receive a stone and are shaped so as to conform somewhat to the shape of the stone.

In addition to the recesses 6, I provide V-shaped gripping members 7 (see Figure 4) which are mounted adjacent to each recess 6 and extend a slight distance into the recesses. The fruit is placed upon the disc 2 so that the seam of the fruit either stands straight up or straight down and lies in the same plane as the plane of the disc. The position of the fruit being determined, the fruit is passed up into the recess 6 so that the V-shaped prongs 7 bite into the flesh and contact with the surface of the stone. In this way the fruit is securely held in place on the disc 2.

The disc 2 is driven at a slow enough speed to permit the operator to place the fruit within the recesses 6 as the disc revolves. The means for revolving the disc may be changed in speed so as to cause the disc to rotate fast or slow in accordance with the speed at which the operator can place the fruit in position. In Figures 1 and 2 I have shown the power source as comprising a motor 6' which is connected to a shaft 8 by a cable 9, the cable being passed around stepped pulleys 10 for permitting the speed ratio between the motor and the shaft 8 to be changed at will. The shaft 8 carries a worm 11 which in turn meshes with a form gear 12 carried by a shaft 13. The shaft 13 carries a worm 14 (see Figure 1) which meshes with a gear 15, the latter being mounted upon a shaft 16' that carries the disc 2.

I have described how the fruit is adapted to be placed upon the periphery of the disc 2 and I will now set forth how the disc 4 cooperates with the disc 2 for holding the stone while the flesh is being severed therefrom. The disc 4 has a plurality of recesses 16 therein similar to the recesses 6 with the exception that a cutout portion 17 is provided adjacent to each recess 16 for making room for the V-shaped members 7 carried by the disc 2. The circumferential distances between adjacent recesses 16 and adjacent recesses 6 are the same, and the rotation of the disc 2 and the disc 4 is such as to cause the recesses to align with each other at the point of juncture between the two discs.

Means for effecting this is shown in Figure 7. It will be noted that the shaft 16' carries a beveled gear 18 which meshes with the beveled gear 19 carried by a shaft 20. The shaft 20 has a telescopic connection with a shaft 21, this connection 22 being non-circular so as to cause the shaft 20 to drive the shaft 21, permitting the shaft 21 to move longitudinally with respect to the shaft 20. Beveled gears 23 connect the shaft 20 with a shaft 24 that carries the disc 4.

The purpose of the telescopic connection between the shafts 20 and 21 is to permit the disc 4 to move radially with respect to the disc 2 for permitting the recesses 6 and 16 to accommodate stones of various sizes. The shaft 24 is mounted in bearings 25 and these bearings are slidably mounted in the frame 1 and are urged in a downwardly direction by springs 26. If the stone is a small one the disc 4 will be moved downwardly and if it is a large one the stone will engage with the disc and cause it to move upwardly against the tension of the springs 26.

It will be noted that as the serrated edges of the recesses 6 and 16 grip the stone that the cutting edges 3 and 5 will sever the flesh and divide the fruit into two halves. I now provide means for severing the flesh from the stone at a point adjacent to the stone regardless of the shape thereof and I further provide means for moving the cut halves away from each other and for dropping them upon the conveyor which may conduct them to any place desired.

The means for severing the flesh at a point adjacent to the surface of the stone comprises one of the principal features of my invention. Wire feed spools 27 are mounted upon the stub shafts 28, these in turn being carried by the frame 1. Springs 29 bear against the sides of the reels 27 and act in a manner hereinafter described for hugging the surfaces of the stone throughout the entire area of the stone. There are two wires 30 and these wires are fed over pulleys 31 and 32 (see Figure 3) and thence downwardly into position where they will be substantially in direct alignment with the stone of the fruit shown by the dotted lines in Figure 3; from this point the wires pass on down to pulleys 33 and 34 (see Figure 2) and thence to take-up reels 35, these reels being mounted upon a shaft 36 (see Figure 1) that in turn carries gears 37 which are in mesh with gears 38 carried by the shaft 16'. In this way the take-up reels 35 are slowly rotated so that the wires will be slowly fed from the reels 27 to the reels 35.

Figure 3 clearly shows how the wires 30 pass on either side of the discs 2 and 4 and are disposed close enough to the discs to contact with the surface of each stone as it passes between the discs. Some of the stones are rough and if it were not for the V-shaped members 7, the wires might cling to the stone and hinder the operation of the machine. However, the V-shaped members 7 not only hold the stone in place prior to the time that the stone is engaged by the two discs, but perform the additional function of acting as cam members for causing the wire to spread, as shown in Figure 6. As the wire passes over the enlarged portion of the stone the wires 30 act as cutters and sever the fruit from a point adjacent to the stone.

In Figure 2, I show the springs 29 as being connected at one of these ends to the bolts 28 and at the other ends to the discs 27', which frictionally bear against the sides of the reels 27. As the wire is pulled off from the reels, it causes the reels to tension the springs 29 because the reels tend to rotate the discs 27' therewith. Of course, after the wires have tensioned to a certain degree, there will be a slippage between the discs 27' and the reels 27. If now a stone is passed between the two wires so as to cause them to be bulged outwardly as they contact with the stone, the reels 27 will feed off this necessary amount of wire. After the wires have passed the high point of the stone the slack in the wires will be instantly taken up by the springs 29 which being under tension as hereinbefore stated will cause the reels 27 to temporarily rotate in the opposite direction. It is due to this particular construction that the wires 30 are kept in close contact with the stone throughout the entire surface of the stone and regardless of the shape of the stone.

In Figure 8 I show a perspective view of the deflecting members 39 and also show the direction which the fruit takes as it passes the deflector, this direction being shown by the arrow $a$. The deflectors 39 carry tubes 39' which act as guides for the wire 30 and prevent the wire from being carried with the stone as the stones are moved between adjacent wires. There are four of these deflecting members, two of them being mounted above the stone and two beneath, the four deflectors being disposed in close proximity to the cutters so as to enter the cut in the fruit made by the cutter discs. The deflectors are secured to the members 41 of the frame 1 and to the chutes 42. The deflectors are supported adjacent to their front ends, i. e., that portion which enters the fruit first. In this way the deflectors will more effectually separate the halves of the cut fruit. The opposite ends 40 are left free so as to more readily bend or flex in different directions, if need be.

In case the stone is broken, the V-shaped members 7 may be provided with prongs 43 (see Figure 6), these prongs engaging with the stone for holding the two halves of the stone together.

After the flesh has been severed from the stone the disc 2 will carry the stone around to a wire 44 (see Figure 7) this wire forcing the stone from the recesses 6 if the stone has not already dropped from the recesses by gravity. The wire lies in close proximity to the surface of the disc 2 and extends substantially to the periphery of the disc where it will engage with all of the stones if the latter have not already dropped from the disc.

In Figure 9 I have shown a slightly modified form of the disc which may take place of the disc 4. In this form of the device the disc 50 has spring plungers 51 mounted adjacent to the recesses 52 corresponding to the recesses 16, the plunger engages with the stone 53 and holds it securely in place, while the flesh is being severed from the stone. This construction does away with the necessity of providing a floating shaft 24.

In Figure 10 I show a modified form of deflector 100 which differs from the deflector 39 in that it is provided with a greater curvature and the curved end is held in place by uprights 101 that are secured to the member 41 and chute 42. Two pairs of deflectors 100 are used as in the form of the device shown in Figure 6 and these deflectors are employed for separating the cut halves of free stone peaches. This form of deflector dispenses with the wire 30 and is therefore not provided with tubes 39'.

I claim:

1. A fruit pitter comprising a pair of discs for cutting the flesh of a fruit and for holding the stone of the fruit, said discs being movable toward and away from each other for adapting said discs to hold stones of various sizes.

2. In a device of the type described, a fruit carrying member having a plurality of recesses therein and means disposed adjacent to said recesses, and being carried by said fruit-carrying member for biting into the flesh of the fruit and engaging with the stone of the fruit for holding it against movement with respect to said fruit-carrying member.

3. In a fruit pitter, a fruit-carrying member having serrated recesses large enough to receive the pit of the fruit, and V-shaped prongs disposed adjacent to said recesses for engaging with the pit.

4. In a fruit pitter, a fruit-carrying member having serrated recesses large enough to receive the pit of the fruit and V-shaped prongs disposed adjacent to said recesses for engaging with the pit, and a second member having serrated recesses and being movable for causing the recesses to register with said first-named recesses for receiving the pit therebetween, said second-named member being movable toward and away from said first-named member for permitting the recesses to accommodate themselves to various sized pits.

5. In a fruit pitter, a pair of flexible wires, means for moving fruit past said wires for causing the wires to closely conform to the surface of the pit as the pit passes thereby, whereby the wires sever the meat from the pit, meat-deflecting members associated with said wires, and wire-guiding tubes carried by said members for receiving said wires.

6. In a fruit pitter, a pair of wire take-up reels and a pair of wire feed reels, flexible wires adapted to be wound upon the take-up reels and to be fed from the feed reels, spring means for yieldingly retarding the rotation of said feed reels, means for moving fruit between said wires for causing the wires to sever the meat from the pit and means for slightly spreading said wires when the pit is passed therebetween.

ALVAN B. McCOLLOM.